Aug. 18, 1931.     W. NOBLE     1,819,301
COOKING APPARATUS
Filed Feb. 18, 1929
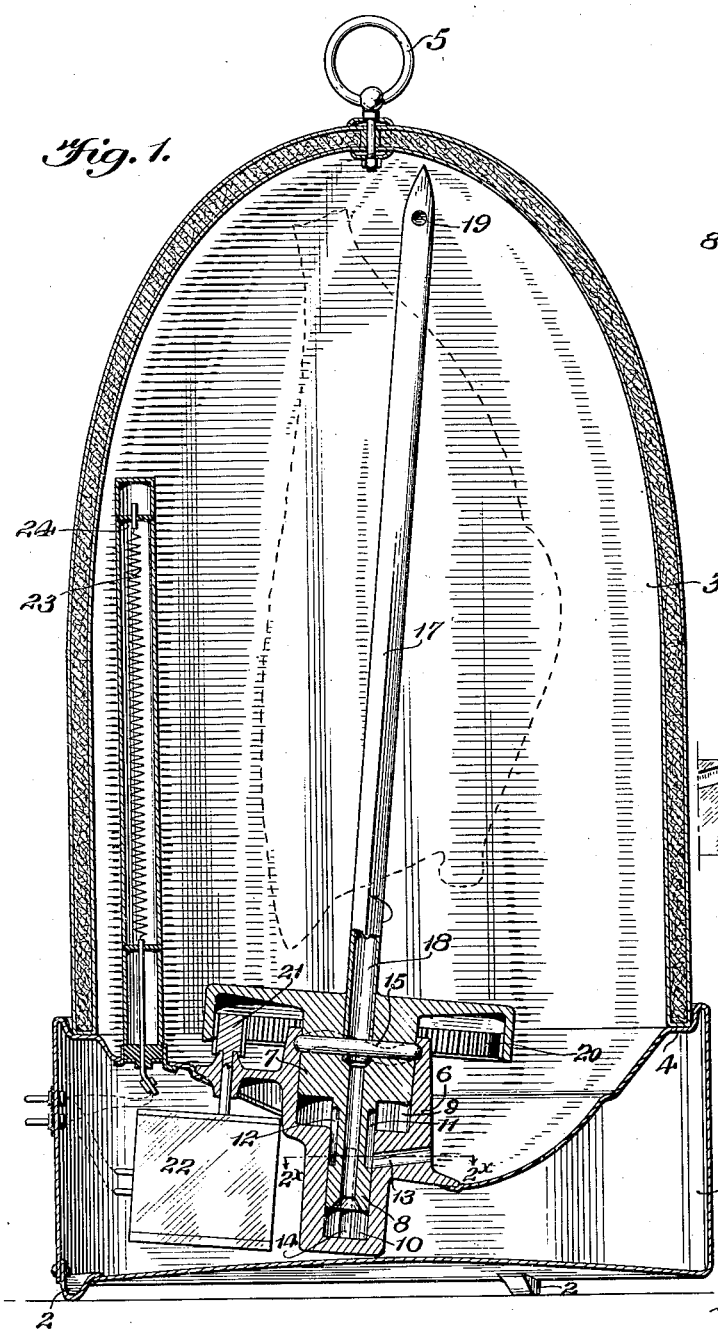
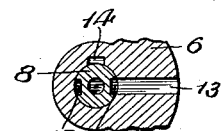
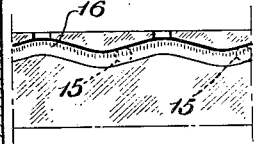
Inventor
Warren Noble.
By Stanley Lightfoot
Attorney Patented Aug. 18, 1931

1,819,301

UNITED STATES PATENT OFFICE

WARREN NOBLE, OF DETROIT, MICHIGAN

COOKING APPARATUS

Application filed February 18, 1929. Serial No. 340,765.

This invention relates to a cooking apparatus which may be advantageously employed as a home barbecue.

The object of the invention is to provide a small apparatus as described above, in which chickens and meats may be roasted or barbecued while exposed during rotation to a heating element.

Another object is to provide a device of the class described which includes an automatic basting means so that the cover therefor need not be raised for any purpose until the cooking is completed. The advantage of this lies not only in the fact that the meat or chicken being cooked requires no attention during cooking, but also prevents odors and smoke therefrom being released in the room since it is well known that there will be no smoke as long as air is excluded from entering the cooking zone.

A more specific object is to provide a pump for basting which comprises a minimum of parts all of which are of such proportions as to insure operation without attention. In other words, a pump is provided which comprises merely a cylinder and a plunger, the plunger uncovering inlet ports and forcing basting fluid upwardly through the center thereof in its simplest embodiment.

Another object is to provide a protected heating element which may be readily cleaned, which will not become oxidized nor coated with grease nor easily subject to damage in handling.

In carrying the invention into effect, I have preferred to use as small an apparatus as possible which is designed to present a neat and attractive appearance and one which due to its size and simplicity of structure may be manufactured at small cost.

Other objects will become apparent as reference is had to the accompanying drawings in which I have illustrated, by way of example, only and not in a limiting sense, one embodiment of my invention and in which Figure 1 represents a view of my apparatus taken through the center line thereof;

Figure 2 is a detail sectional view taken along line 2$^x$—2$^x$ of Figure 1; and Figure 3 is a view showing the development of the cam employed in connection with the basting pump.

Referring more particularly to the drawings, numeral 1 designates the base of my apparatus which is provided with legs 2 and which supports a cover 3 on a shoulder 4 provided therefor. The cover 3 may be made of sheet metal or any other material desired, but is preferably composed of a heat resisting transparent material and is provided at the top with a handle 5. The top of the base extends downwardly from the shoulders 4 to form a basin or reservoir for a purpose to be hereinafter explained.

Supported in the top of the base 1 at a point somewhat offset from the center thereof is a pump assembly generally designated by reference character 6. The pump comprises a piston 7 carrying a cylindrical extension 8 which fits into tandem cylinders 9 and 10. The extension 8 is provided with two longitudinal grooves 11 and 12 which may intermittently uncover an inlet passage 13 whereupon communication is established between the reservoir and the interior of the upper tandem cylinder 9. A groove 14 extends from the outer part of the lower tandem cylinder 10 along the cylinder wall to a point substantially above the outer part of slots 11 and 12.

The piston 7 together with its extension 8 is supported by a pin 15 which rides in a cam groove 16 so that upon rotation of the piston a reciprocating motion will be imparted thereto, the extent of which may be any length desired according to the design of the cam 16.

It will be noted that the axis of the piston 7 is tilted out of the vertical so that a bayonet shaped spit 17 carried thereby will traverse the axis of the cover 3 so that a piece of meat or a chicken, indicated in dotted lines, will rest substantially in the center of the cover 3 and will be angularly supported so that drippings therefrom will fall or run down into the reservoir in front of the inlet passage 13. The spit 17, the piston 7 and the extension 8 have a passageway 18 extending throughout their length so that the bottom of this passage is open to the outer tandem cylinder 10 while the top of the passage empties at points 19 along the sides of the spit at a point substantially adjacent the top thereof so that juices and grease therefrom will fall on the meat thereby forming a basting means.

The operation of the pump then is as follows: suppose the parts to be in the position shown and that the pump is on its upward stroke. The slot 11 in its rotation has uncovered the inlet passage 13, being in the position shown in Figure 2. As the piston is not only rotating but also travelling upwardly, it creates a suction in the cylinder 9 which acts to induce juice and grease from the reservoir into the cylinder. Further rotation of the piston to a point where the piston reaches the top of its stroke likewise rotates the groove 11 past passage 13 and shortly thereafter causes the groove 11 to uncover the groove 14 so that as the piston 7 descends the juice contained in the cylinder 9 is forced into groove 14 and outwardly through the passage 18 to the end of the spit. It is seen that when the piston 7 reaches the bottom of its stroke the passage 18 will be full of juice so that groove 11 in passing groove 14 at this time forms a cut-off valve maintaining the passage 18 full of juice until the piston 7 again starts on a downward stroke. In view of the fact that the piston 7 reciprocates twice during each rotation, two grooves 11 and 12 are provided.

In order to drive the pump the top of the piston may be extended and flanged to support a ring gear 20 which meshes with a small gear 21 driven by a small motor 22.

The heating element 23 may be merely an exposed electrical resistance coil but is preferably housed by a thin tube 24. If desired, this element may be demountable. By providing the housing 24 the element 23 will be protected against corrosion and coating with grease while the housing provides a surface readily cleanable.

It will be understood that various changes such as various types of pumps, various types of heating elements, various forms of covers and the like may be made without departing from the spirit of my invention, and I consequently desire to be limited in the application and construction thereof only by the scope of the appended claims, wherein

What I claim is:

1. In a roaster, a support, a hollow spit rotatably mounted on said support, means for rotating said spit, means for feeding juices and grease through said spit for basting, and a heating element mounted in spaced relation from said spit.

2. In a roaster, a hollow spit carried by said support, a heating element in spaced relation with said spit, means for setting up relative rotation between said spit and said element and an automatic basting means discharging through and having an outlet near the top of said spit.

3. In a roaster, a base support, a spit rotatably mounted in said support, a heating element also mounted on said support, means for rotating said spit, and means for reciprocating said spit during rotation whereby a pumping action is provided and means for utilizing the pumping action of said spit for basting.

4. In a roaster, a support having a hollow cylinder residing thereon, a spit rotatably mounted in said cylinder, the end of said spit comprising a piston, means for reciprocating said spit, means for conveying juices and grease into said cylinder for action thereon by said piston, a line leading from said cylinder to a point adjacent the top of said spit whereby basting is accomplished and a heating element, said spit and said heating element being relatively rotatable.

5. In a roaster, a support having a cylindrical member residing therein, a spit rotatably mounted in said cylinder, the end of said spit comprising a piston, means for rotating said spit, means for causing reciprocation of said spit during rotation thereof whereby a pumping action is imparted to said piston, an inlet for juices and grease into said cylinder from a reservoir, a pipe line leading from said cylinder to a point adjacent the upper end of said spit whereby automatic basting is provided and a heating element in operative position with respect to said spit.

6. In a roaster, a support having a hollow cylindrical member fixed thereto, a hollow spit rotatably mounted in said cylinder, the lower end of said spit comprising a piston hollow, means for reciprocating said piston whereby a pumping action is set up and a valved inlet for juices and grease into said cylinder, the passageway through said piston and said spit comprising the outlet for said grease whereby automatic basting is provided, and a heating element in operative relation with respect to said spit.

7. In a barbecue cooking apparatus, a base having a depression comprising a grease reservoir therein, a casting including a hollow cylindrical bore having an axis slightly offset from the vertical supported by said base, a spit rotatably mounted in said bore, means for rotating said spit, means for reciprocating said spit whereby a pumping action is provided between the bottom of said spit and said bore, a valved inlet into the bore from said reservoir, a passageway extending substantially the length of said spit comprising an outlet from the pump and a heating element in operative relation with said spit.

8. In a roaster, a base support having a central depression therein forming a reservoir, a heating element mounted on said support, a hollow spit rotatably mounted in said base and a basting pump, said pump comprising a cylinder mounted in said support and a piston formed on the end of said spit, said piston having an extension thereon provided with grooves extending longitudinally thereof, and a passageway extending axially thereof as a continuation of the passage of said spit, an inlet passage through said cylinder, the grooves in said extension periodically uncovering said inlet upon rotation and reciprocation of said piston during the upward stroke thereof to establish communication between said reservoir and the interior of said cylinder whereby juice and grease is induced therethrough by the suction of said piston, further rotation of said piston closing said inlet passage and uncovering a passageway leading beneath the end of said extension whereby said piston on its down stroke forces the greases in said cylinder through the axial passageway of said extension and said spit.

9. In a roaster, a base support having a central depression therein forming a reservoir, a heating element mounted on said support, a hollow spit rotatably mounted in said base and a basting pump, said pump comprising a cylinder mounted in said support and a piston formed on the end of said spit and residing in said cylinder for rotation and reciprocation under the influence of a cam integral with the walls of said cylinder, said piston having an extension thereon provided with grooves extending longitudinally thereof, and a passageway extending axially thereof as a continuation of the passage of said spit, an inlet passage through said cylinder, the grooves in said extension periodically uncovering said inlet upon rotation and reciprocation of said piston during the upward stroke thereof to establish communication between said reservoir and the interior of said cylinder whereby juice and grease is induced therethrough by the suction of said piston, further rotation of said piston closing said inlet passage and uncovering a passageway leading beneath the end of said extension whereby said piston on its down stroke forces the greases in said cylinder through the axial passageway of said extension and said spit.

10. In combination with a roaster having a base, a spit and a cover therefor, an electrical resistance comprising a heating element extending upwardly through said base, a tube closed at one end fitting over said heating element for forming a steam tight housing therefore, said tube being rigidly attached to said base and having insulating spacers therein for supporting and maintaining said heating element in spaced relation from said walls, said tube and said element extending upwardly in substantially spaced relation from said spit for heating meats carried thereby.

11. In a roaster, a base, a hollow spit mounted in said base, a heating element mounted on said base, a detachable cover supported by said base for housing said heating element and said spit and means for discharging greases and juices into the interior of said cover through said spit for basting.

12. In a roaster, a support, a hollow spit connected to said support, a heating element disposed in spaced relation to said spit, means for creating a relative movement between said spit and said heating element and means for discharging greases and juices through said spit for basting.

13. In a roaster, a base, a hollow spit mounted in said base, a heating element mounted on said base, a detachable cover supported by said base for housing said heating element and said spit and means for discharging greases and juices into the interior of said cover through said spit for basting, comprising pump means and a driving mechanism common to said pump means and said spit for operating the former and for rotating the spit.

In testimony whereof I affix my signature.
WARREN NOBLE.